United States Patent
Li et al.

(10) Patent No.: US 7,671,940 B2
(45) Date of Patent: Mar. 2, 2010

(54) DUAL PANEL DISPLAY AND METHOD FOR IMPROVING DISPLAY PERFORMANCE THEREOF

(75) Inventors: Rui-Yong Li, Tao-Yuan Hsien (TW); Chuan-Pei Yu, I-Lan Hsien (TW)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 955 days.

(21) Appl. No.: 11/277,352

(22) Filed: Mar. 23, 2006

(65) Prior Publication Data

US 2007/0097296 A1    May 3, 2007

(30) Foreign Application Priority Data

Nov. 3, 2005    (TW) .............................. 94138580 A

(51) Int. Cl.
*G02F 1/1335*    (2006.01)
(52) U.S. Cl. ..................... 349/114; 349/113; 349/56; 349/62; 349/67
(58) Field of Classification Search ............. 349/114, 349/113, 56, 58, 61, 62, 63, 65, 67
See application file for complete search history.

(56) References Cited

U.S. PATENT DOCUMENTS

| | | | | |
|---|---|---|---|---|
| 6,961,105 | B2* | 11/2005 | Chang et al. | 349/114 |
| 2005/0195344 | A1* | 9/2005 | Chang et al. | 349/114 |
| 2005/0264719 | A1* | 12/2005 | Sung et al. | 349/96 |
| 2007/0097296 | A1* | 5/2007 | Li et al. | 349/114 |
| 2007/0117432 | A1* | 5/2007 | Kim et al. | 439/171 |

FOREIGN PATENT DOCUMENTS

JP    2004354751A Y    12/2004

* cited by examiner

*Primary Examiner*—Brian M Healy
(74) *Attorney, Agent, or Firm*—Wei Te Chung

(57) ABSTRACT

A dual panel display has a housing, a first display panel, a second display panel, and a backlight module positioned between the first display panel and the fixing face of the housing. The backlight module includes a light guide panel, a light source, at least a transflective film and at least an optical property enhancement film between the light guide panel and the second display panel. The transflective film is positioned between the light guide panel and the fixing face for reflecting a part of light from the light guide sheet so that the part of light passes back into the light guide panel.

28 Claims, 14 Drawing Sheets

DUAL PANEL DISPLAY AND METHOD FOR IMPROVING DISPLAY PERFORMANCE THEREOF

BACKGROUND OF THE INVENTION

1. Field of the Invention

The invention relates to a dual panel display, and more particularly, to a dual panel display with a structured that can improve the mura or uneven-brightness problems.

2. Description of the Prior Art

The liquid crystal display (LCD) is a thin and save electricity flat display. It uses a backlight source to produce light, and uses the different liquid crystal revolving angles and the polarized light layer beside the liquid crystal to control the transmittance for displaying images. The LCD has advantages of stable appearance and no twinkle, and therefore LCDs have been widely applied to many devices, such as mobile phone, PDA, notebook, digital camera or other portable products. Owing to new products continuously entering the market, the technology of the LCD also keeps on improving. The latest fashion is to dispose dual panel displays on various products.

Fox example, modern design of mobile phones is to dispose two displays on two sides of the mobile phone, wherein one of the two displays is a main display panel and the other one is a sub-display panel. The sub-display panel display images on the outer side of the housing of the mobile phone for displaying simple characters or image signals such that the user can read information from the sub-display without answering phone calls. On the other hand, the main display panel is usually disposed on the inner side of the housing of the mobile phone for displaying complicated information or image signals.

With reference to FIGS. 1-3, FIGS. 1-2 are a front and a back schematic diagrams of a dual panel display 10 according to the prior art respectively, and FIG. 3 is a sectional view of the dual panel display 10 shown in FIG. 1. As shown in FIG. 1, the dual panel display 10 includes a housing 14 and a main display panel 16, wherein the region encompassed by the dotted line is a display region 34 of the main display panel 16. FIG. 2 illustrates that the housing 14 has a fixing frame 14c for positioning a sub-display panel 18 with a smaller size than the main display panel 16, wherein the region encompassed by the dotted line is a display region 36 of the sub-display panel 18. The relative position of other elements of the dual panel display 10 is illustrated in FIG. 3. The housing 14 includes a fixing plane 14a for containing the main display panel 16 and the backlight module 12. The backlight module 12 typically comprises a light source 20, a light guide plate 22, and further comprises a diffuser film 30, two prism films 28, 26, and a protect diffuser film 24 positioned on the light guide plate 22 in order. On the other side of the fixing plane 14a, the sub-display panel 18 and some optical films of the sub-display panel 18 are positioned near the fixing plane 14a while only a diffuser film 32 is illustrated in FIG. 3. In addition, the fixing plane 14a further comprises an opening 14b with a size approximately equal to the size of the sub-display panel 18.

The theory of the prior art dual panel display 10 is described as below: The light source 20 produces light so that light propagates into the light guide plate 22 and diffuses in the whole light guide plate 22. Then, a part of light propagates through the first light-exit surface 40 of the light guide plate 22 and passes through the diffuser film 30, the prism films 28, 26, and the diffuser film 24 so as to enter the main display panel 16; and the other part of light propagates through the second light-exit surface 42 of the light guide plate 22 to the fixing plane 14a of the housing 14 and is reflected back to the light guide plate 22 to further provide light source to the main display panel 16. However, when light from the second light-exit surface 42 propagates to the opening 14b, it will pass through the fixing plane 14a and enter the diffuser film 32 to provide light source to the sub-display panel 18. Since partial light passes through the opening 14b to the sub-display panel 18, a relatively dark region occurs in the display region 34 of the main display panel 16, which corresponds to the area of the sub-display panel 18 and is called a window problem or a mura problem of the main display panel 16.

For solving the mura problem, the conventional method pays attention to researching and designing the pattern of the light guide plate 22. For example, a special pattern may be designed for the portion of the light guide plate 22 corresponding to the opening 14b in order to uniform the brightness or increase brightness of the region occurring the window problem. However, the method of designing the pattern of the light guide plate 22 is complicated and costs much time, and it is uneasy to achieve a satisfying performance through designing the pattern of the light guide plate 22. Besides, according to the prior-art method, the pattern of the light guide plate 22 has to be re-designed when the position of the sub-display panel 18 is changed in different application.

In addition, the fixing plane 14a has a thickness $T_h$, so the gap between the light guide plate 22 and the diffuser film 32 must be larger than the thickness $T_h$, which causes an optical defect at the position of the opening 14b, resulted in a more serious window problem in the main display panel 16 corresponding to the edge of the opening 14b.

To conclude, how to improve the mura problem or window problem of the main display panel in a dual panel display caused by providing light to the sub-display panel through a simple and effective method is still an important issue for the manufacturers.

SUMMARY OF THE INVENTION

It is therefore a primary objective of the claimed invention to provide a method for improving the mura problem of a dual panel display by providing at least a transflective film and an optical property enhancement film to the dual panel display to solve the above-mentioned mura problem of the main display panel caused by providing light source to the sub-display panel in a dual panel display.

According to the claimed invention, a dual panel display is provided, which comprises a housing having a fixing plane, a first display panel positioned at a side of the fixing plane, a second display panel positioned at another side of the fixing plane, and a backlight module positioned between the first display panel and the fixing plane. The backlight module comprises a light guide plate, a light source positioned near a light-incidence surface of the light guide plate, at least a transflective film and least an optical property enhancement film positioned at a side of the light guide plate adjacent to the second display panel. The light guide plate comprises a first light-exit surface and a second light-exit surface, and the first and second light-exit surfaces are adjacent to the light-incidence surface and parallel to each other. The transflective film is positioned between the second light-exit surface of the light guide plate and the fixing plane, and is capable of reflecting part light propagating form the second light-exit surface back to the light guide plate.

According to the claimed invention, a method for improving display images of a dual panel display is also provided, wherein the dual panel display comprises a housing with a fixing plane, a first display panel positioned at a first side of the fixing plane, a second display panel positioned at a second side of the fixing plane, and a backlight module positioned between the fixing plane and the first display panel. The fixing plane has an opening with a size approximately equal to the size of the second display panel. The backlight module comprises a light guide plate and a light source. The present invention method can improve the window problem near the opening of the display images of the first display panel, and the steps of the present invention method comprises: providing at least a transflective film positioned between the light guide plate and the fixing plane for reflecting part light propagating from the light guide plate back to the light guide plate, and providing at least an optical property enhancement film disposed at a side of the light guide plate adjacent to the second display panel, wherein the optical property enhancement film can enhance local optical property to improve the optical performance near the opening. The transflective film is selected from the group consisting of: transparent sheet, dual brightness property enhancement film, lens, diffuser film, and films with adjustable transmission rate or reflection rate. The optical property enhancement film is selected from the group consisting of transparent sheet, dual brightness property enhancement film, lens, reflection film, and diffuser film.

It is an advantage of the present invention dual panel display that at least a transflective film and one or more optical property enhancement film (such as brightness enhancement films) that enhances optical property are positioned between the light guide plate and the fixing plane with the opening so that much light propagating from the second light-exit surface of the light guide plate can be reflected back to the light guide plate to improve local optical property for providing good light source to the main display panel and further improving the window problem or uneven brightness of the main display panel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
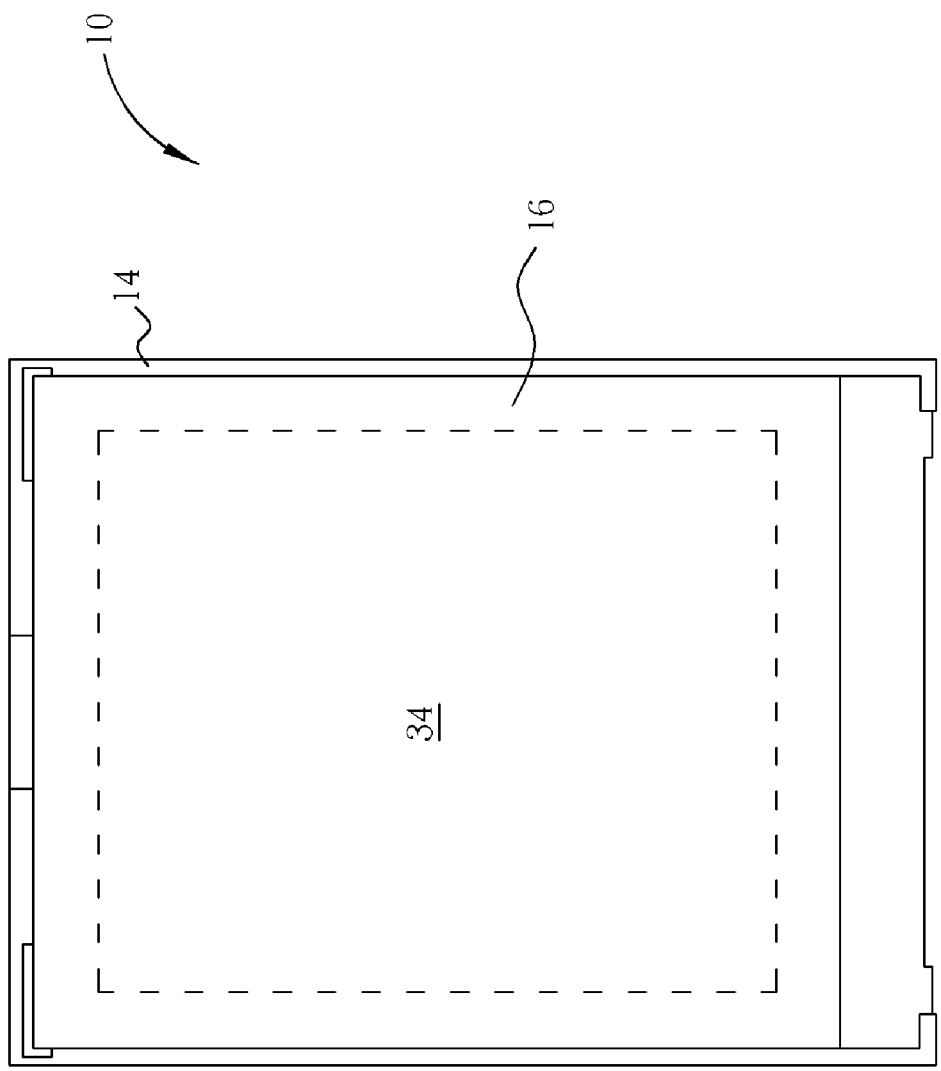
FIG. 1 is a front schematic diagram of a dual panel display according to the prior art.
Figure 2:
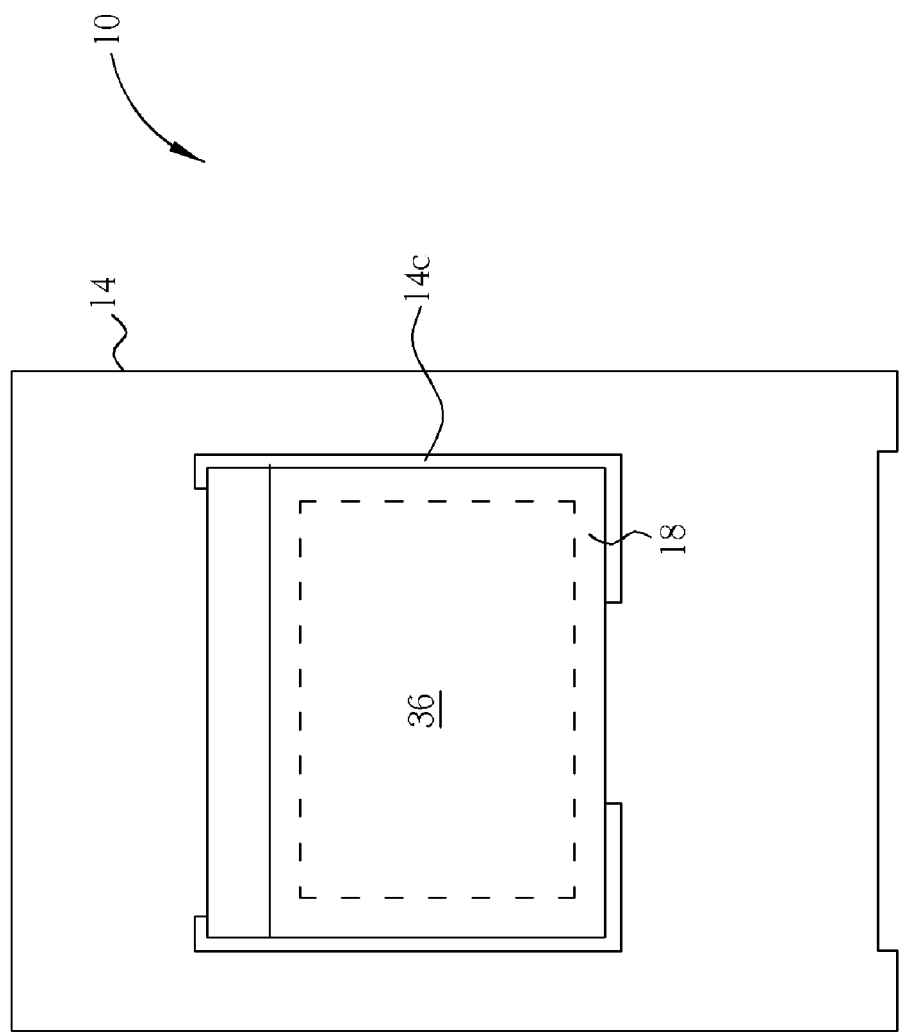
FIG. 2 is a back schematic diagram of the dual panel display shown in FIG. 1.
Figure 3:
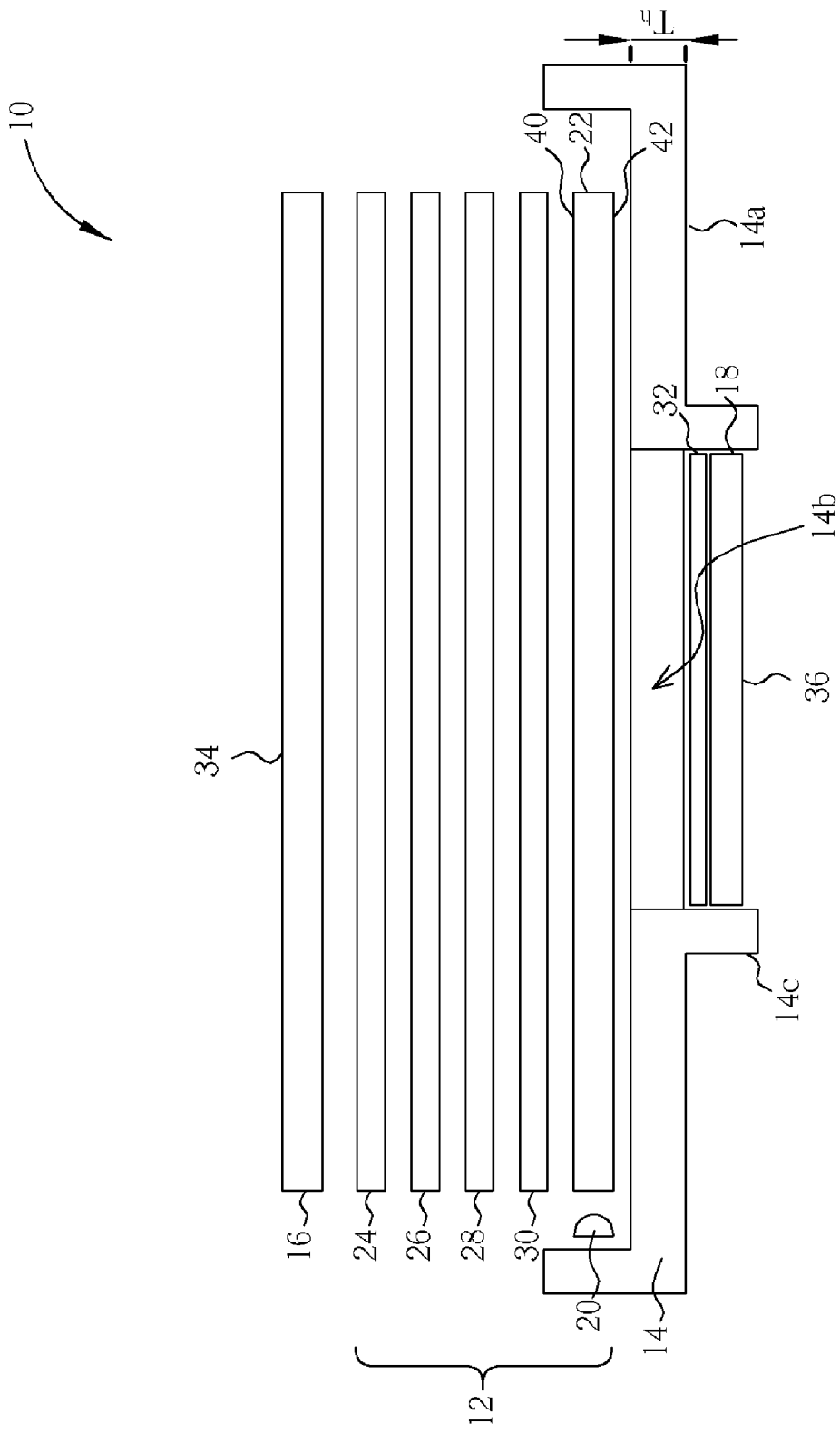
FIG. 3 is a sectional view of the dual panel display shown in FIG. 1.
Figure 4:
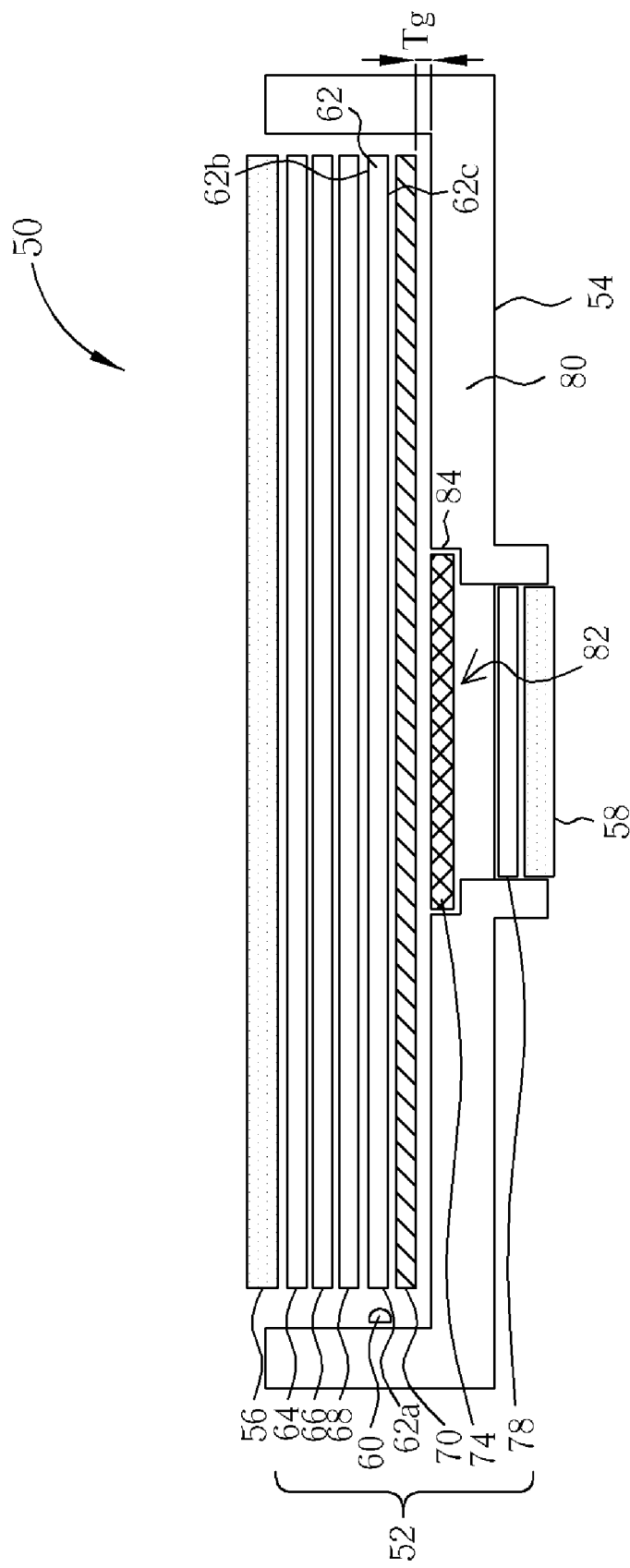
FIG. 4 is a sectional view of a dual panel display according to a first embodiment of the present invention.

Referring to FIG. 4, FIG. 4 is a sectional schematic diagram of a dual panel display according to a first embodiment of the present invention. As shown in the figure, the present invention dual panel display 50 comprises a backlight module 52, a housing 54, a main display panel 56 and a sub-display panel 58 having a size smaller than the size of the main display panel 56. The housing 54 comprises a fixing plane 80 for positioning the main display panel 56 and the sub-display panel 58. The fixing plane 80 has an opening 82 with a size approximately the same as the size of the sub-display panel 58 so that light produced by the backlight module 52 can pass through the opening 82 to the sub-display panel 58. The backlight module 52 comprises a light guide plate 62, made of a plastic material, having a light-incidence surface 62a, a first light-exit surface 62b, and a second light-exit surface 62c, wherein the first light-exit surface 62b and the second light-exit surface 62c are adjacent to the light-incidence surface 62a and parallel to each other. The backlight module 52 further comprises a light source 60 positioned near the light-incidence surface 62a, a diffuser film 68, at least a prism film 66, a protect diffuser film 64 positioned on the first light-exit surface 62b in order. In addition, the backlight module 52 further comprises a diffuser film 78 positioned between the sub-display panel 58 and the fixing plane 80. The surface of the fixing plane 80 facing to the main display panel 56 may be silver or white for reflecting light propagating to the fixing plane 80 back into the light guide plate 62. Furthermore, for improving the window problem of the main display panel 56, the present invention backlight module 52 further comprises a transflective film 70 and an optical property enhancement film 74 that can enhance local brightness positioned between the second light-exit face 62c and the fixing plane 80. The transflective film 70 is disposed directly next to the light guide plate 62 and is selected from the group consisting of transparent sheet, dual brightness property enhancement film, lens film, diffuser film, and films that are capable of adjusting their transmission rate and reflection rate.

Figure 5:
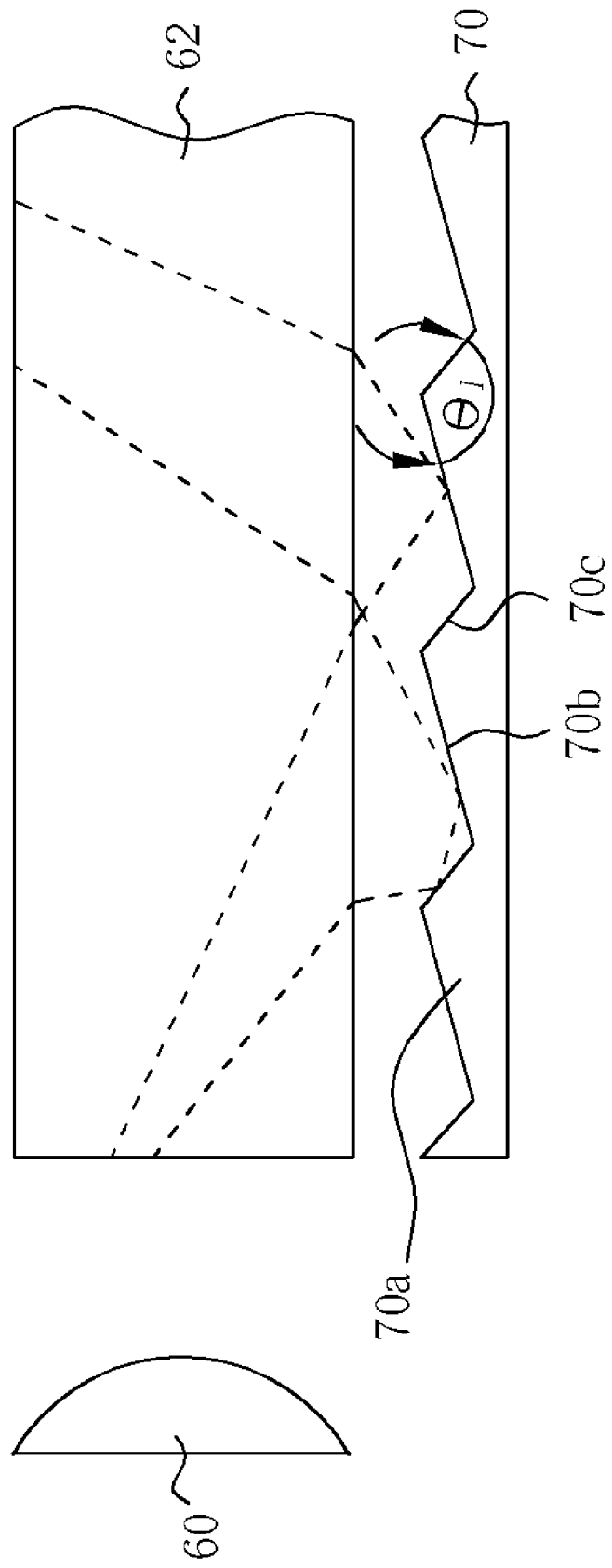
FIGS. 5-8 are partial enlargement diagrams of the transflective film shown in FIG. 4.

When the transflective film 70 is made of a lens, the surface of one of its side adjacent to the light guide plate 62 comprises a plurality of prisms, as shown in FIG. 5. FIG. 5 is a partial enlarged figure of the transflective film 70 shown in FIG. 4, wherein the transflective film 70 is a lens. The top surface of the transflective film 70 comprises a plurality of prisms 70a with functions of lens, and each prism 70a is a protrusion composed of a first prism surface 70b and a corresponding second prism surface 70c, wherein the first prism surface 70b faces the light source 60 and the second prism surface 70c faces away from the light source 60. According to the present invention, a function of the transflective film 70 is to reflect a portion of the light form the second light-exit surface 62c back to the light guide plate 62, and therefore the design principle of the lens is to improve the amount of reflection surfaces on the transflective film 70. As shown in FIG. 5, the area of the first prism surface 70b is larger than that of the second prism surface 70c, and the included angle $\theta_1$ of the first, the second prism surfaces 70b, 70c is an obtuse angle, which can improve the amount of the reflection layers of the transflective film 70. Accordingly, most light propagating from the light guide plate 62 can be reflected upward and back to the light guide plate 62 so as to provide uniform backlight source to the main display panel 56, as shown with the dotted lines.

Figure 6:
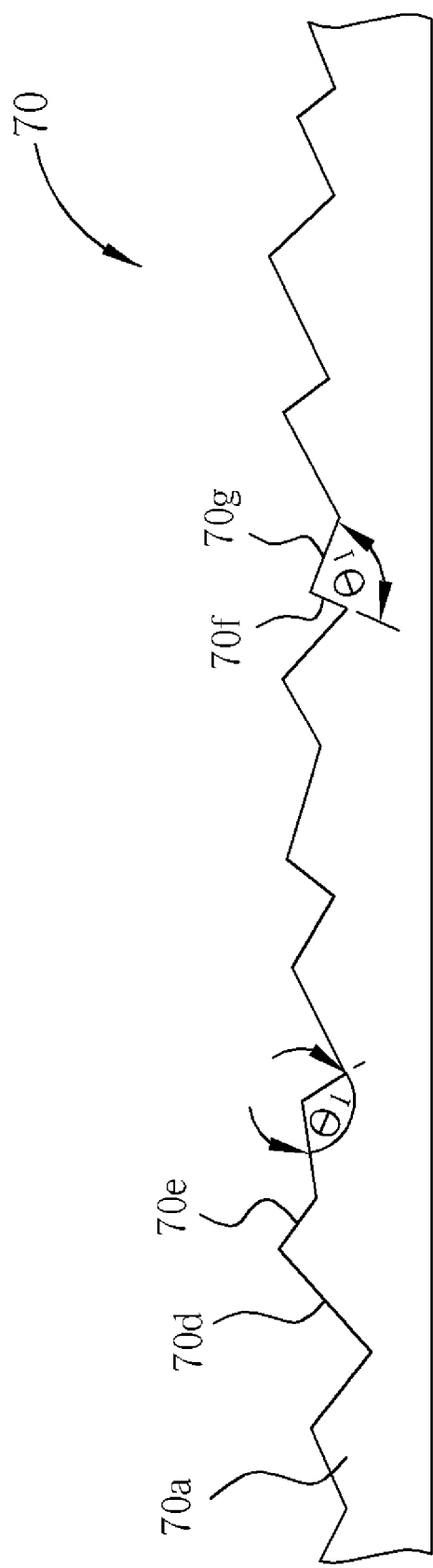
Figure 7:
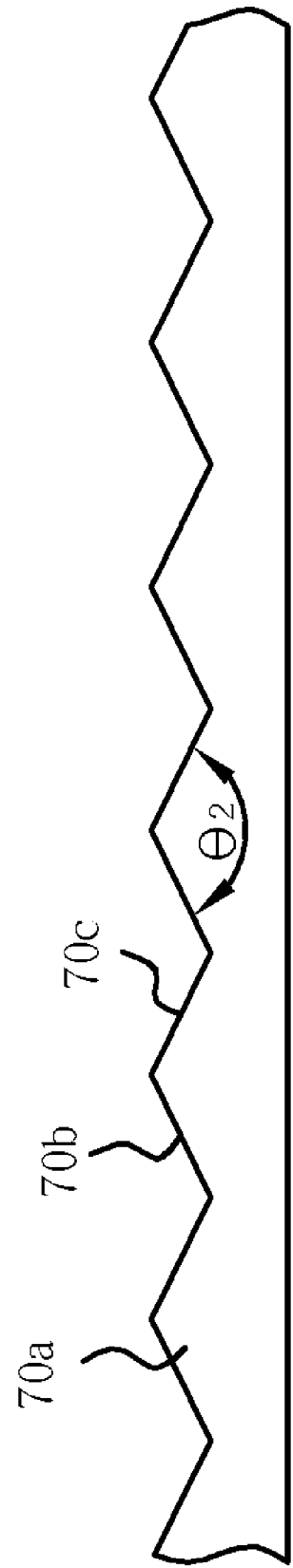

In addition, in order to meet some specific optical requirement in some embodiments, the transflective film 70 can be designed to have prisms 70a with different included angles $\theta_1$ of the first, the second prism surfaces 70b, 70c, and the areas of the first, and the second prism surface 70b, 70c may not be completely the same. As shown in FIG. 6, the transflective film 70 has the first prism surfaces 70d, 70f with different areas and the second prism surface 70e, 70g with different areas, and the included angle $\theta_1$ of each prism 70a are not completely the same. Furthermore, referring to FIG. 7, in another embodiment, the first and the second prism surfaces 70b, 70c of each prism 70a have the same areas, but the included angles $\theta_2$ of the prisms 70a have to be obtuse so that the transflective film 70 can have preferable reflection performance.

Figure 8:
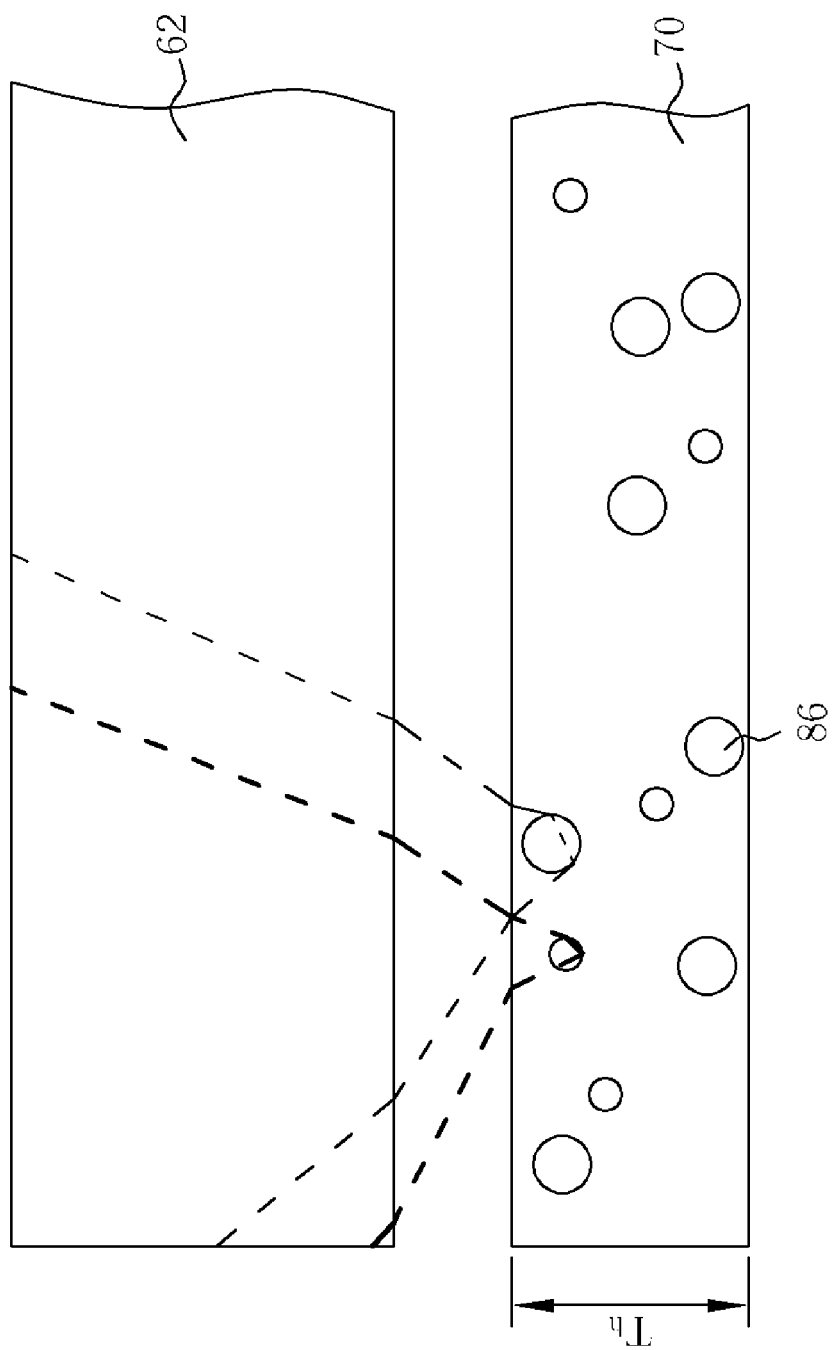

In addition, please refer to FIG. 8, which is an partial enlargement figure of another transflective film 70 of the present invention. The transflective film 70 shown in FIG. 8 is a planar sheet, not a lens. In order to raise the reflection rate of light reflected back to the light guide plate 62, the transflective film 70 comprises a plurality of diffuser particles 86 spread therein. When light is emitted form the second light-exit surface 62c of the light guide plate 62 and propagates to the transflective film 70, the path of light will be changed by the diffuser particles 86 so that it will be refracted to the light guide plate 62, as shown with the dotted lines. In addition, in order to enhance the performance of the transflective film 70, the thickness $T_h$ of the transflective film 70 may be specially designed. For example, the thickness $T_h$ may be thickened for disposing more diffuser particles 86 in the transflective film 70 for raising the reflection rate of light reflected back to the light guide plate 62.

On the other hand, the optical property enhancement film 74 is a thin film has the functionality of improving the window problem near the edge of the opening 82 of the main display panel 56 resulting from the thickness of the fixing plane 80, and therefore the optical property enhancement film 74 need to be made by materials that can enhancing local optical property. Accordingly, the material of the optical property enhancement film 74 is selected from the group consisting of transparent sheet, dual brightness property enhancement film, lens, reflection film, and diffuser film. There is a gap $T_g$ between the optical property enhancement film 74 and the transflective film 70, as shown in FIG. 4. According to experiment data of the design of an LCD, the window problem near the edge of the opening 82 of the main display panel 56 can be effectively improved when the gap $T_g$ is small enough, and the gap $T_g$ is preferably less than 5 mm. Therefore, according to the present invention, the portion of the fixing plane 80 near the opening 82 has a cave positioner 84 for positioning the optical property enhancement film 74 so as to obtain the smallest gap $T_g$ between the optical property enhancement film 74 and the transflective film 70.

Figure 9:
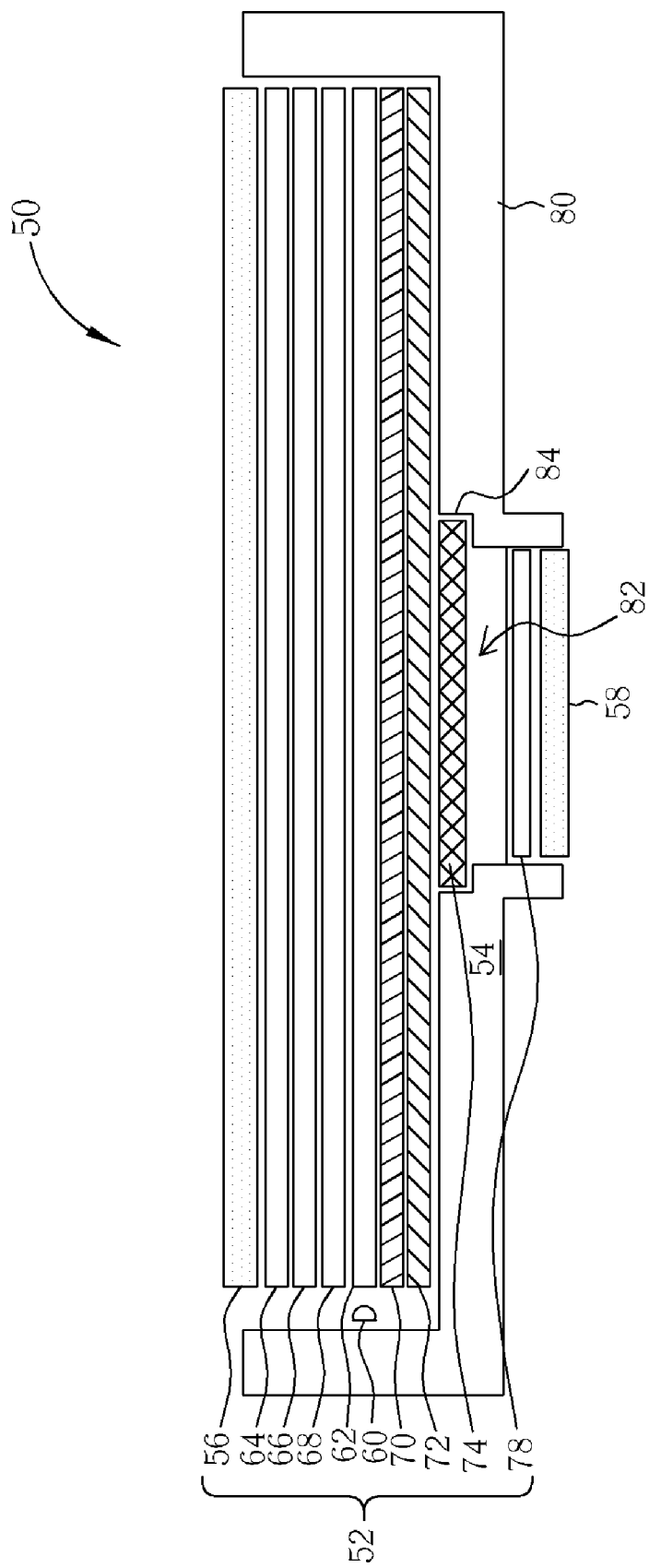
FIG. 9 is a sectional view of a dual panel display according to a second embodiment of the present invention.
Figure 10:
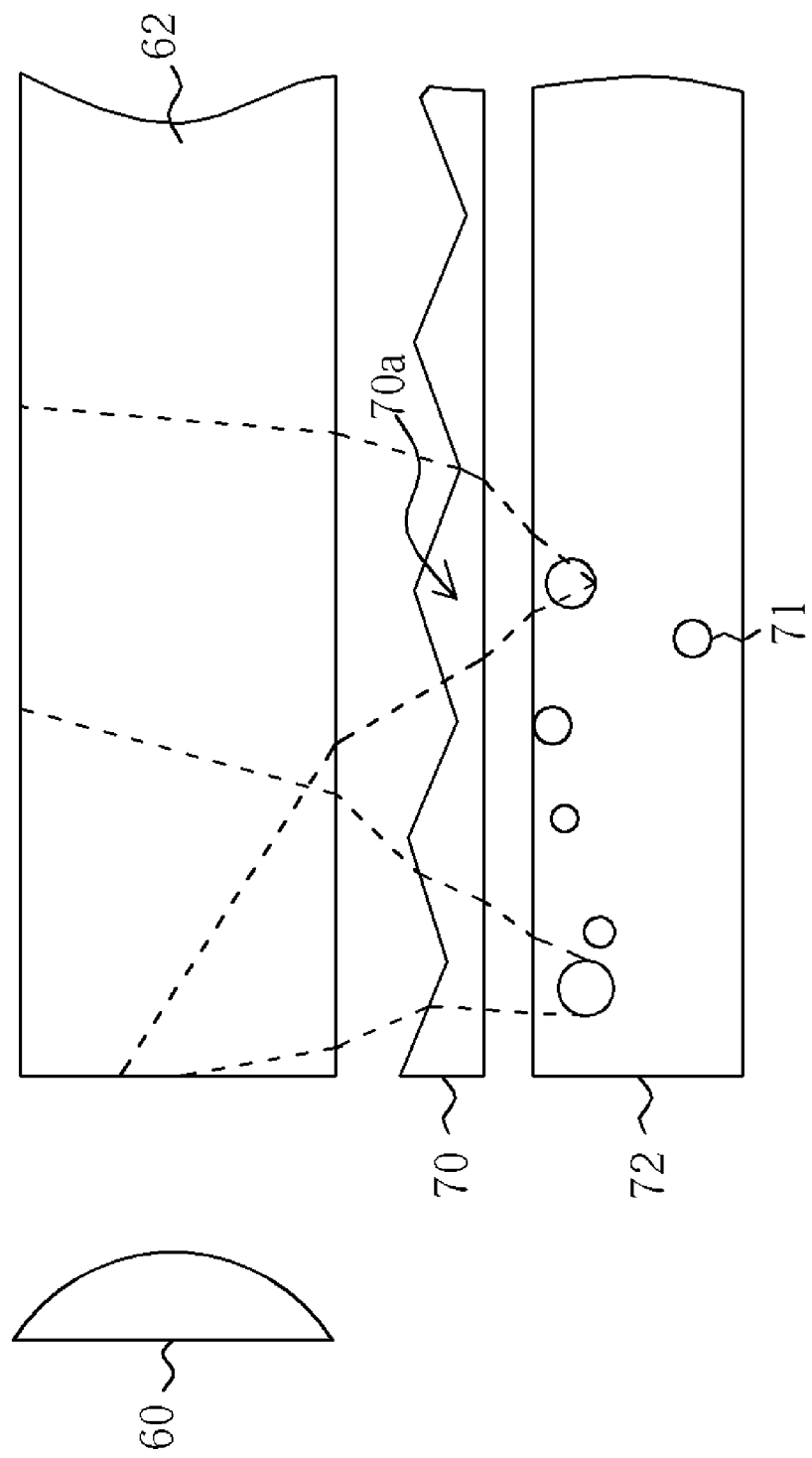
FIGS. 10-11 are partial enlargement diagrams of the transflective film shown in FIG. 9.
Figure 11:
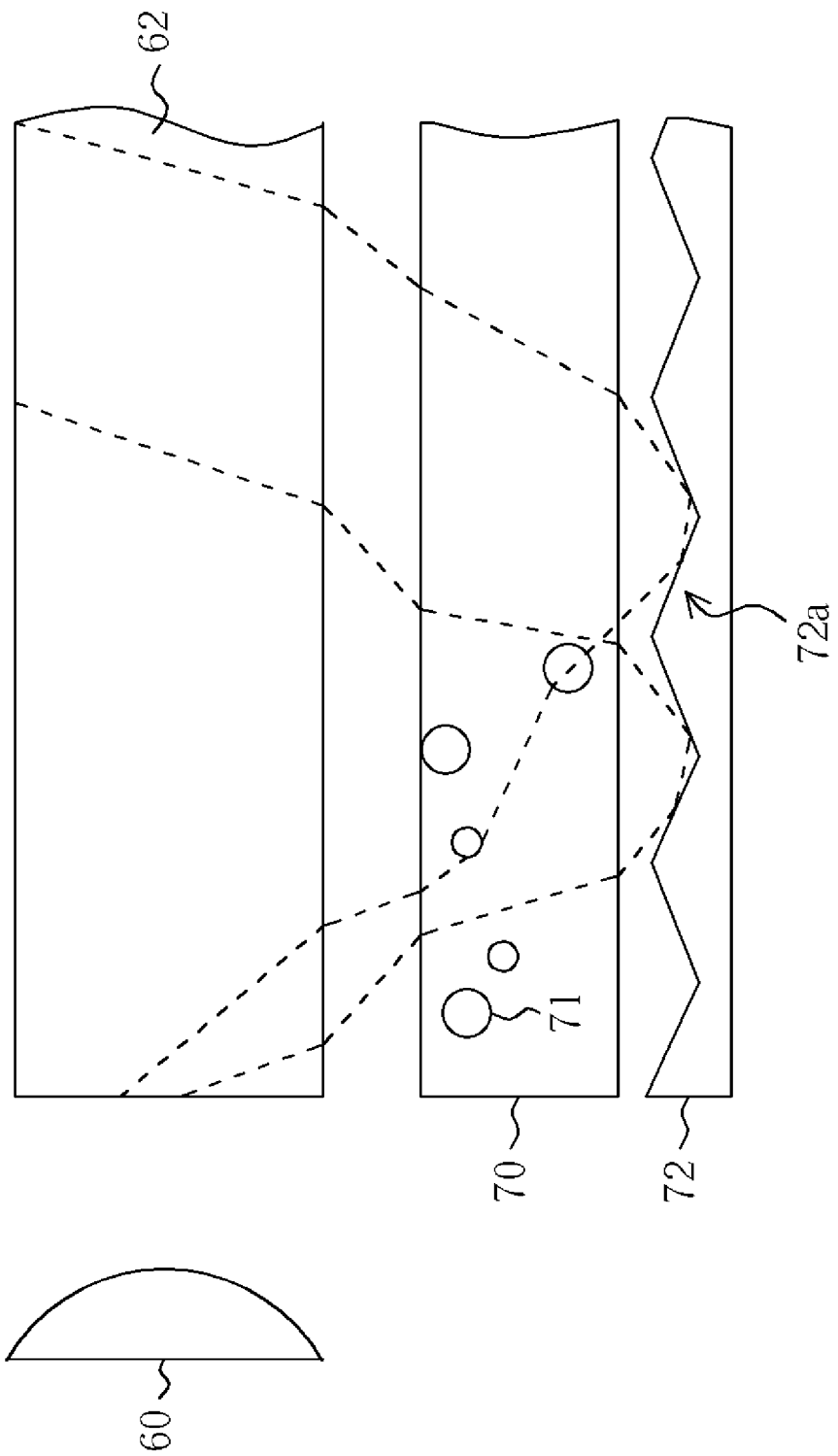

Referring to FIG. 9, FIG. 9 is a dual panel display according to a second embodiment of the present invention, wherein the numerals of elements in FIG. 9 is the same as that in FIG. 4 for explanation. The dual panel display 50 in FIG. 9 also comprises a backlight module 52, a main display panel 56, and a sub-display panel 58 fixed on a housing 54. It should be noted that the backlight module 52 of this embodiment comprises two transflective films 70 and 72, and each of the transflective films 70, 72 may be respectively selected form the group consisting of transparent sheet, dual brightness property enhancement film, lens, reflection film, diffuser film, and films that can adjusting its transmission rate or reflection rate, which means the transflective films 70, 72 may be the same material films or different material films. FIG. 10 is a diagram shows that the transflective films 70 and 72 are a lens and a diffuser film respectively. As shown in the figure, the surface of the transflective film 70 adjacent to the light guide plate 62 comprises a plurality of prisms 70a, and the transflective film 72 comprises a plurality of diffuser particles 71 therein. Since there are two transflective films 70, 72 positioned below the light guide plate 62, the reflection rate of light reflected back to the light guide plate 62 can be raised. However, the transflective films 70, 72 may be a diffuser film and a lens respectively in other embodiments. As shown in FIG. 11, the transflective film 70 is a planar diffuser film and comprises a plurality of diffuser particles 71 spread therein while the transflective film 72 is a lens with a plurality of prisms 72a on its surface. Therefore, light propagating from the second light-exit surface of the light guide plate 62 can be easily reflected back to the light guide plate 62 through the transflective films 70, 72, as shown by the dotted lines. However, the materials of the transflective films 70, 72 are not limited by the lens or diffuser film, and may be any of the materials in the above-mentioned material group of the transflective film respectively. And the order of the transflective films 70, 72 is also various. Furthermore, the amount of the transflective films may be increased if need be for raising the ratio of light reflected back to the light guide plate 62.

Figure 12:
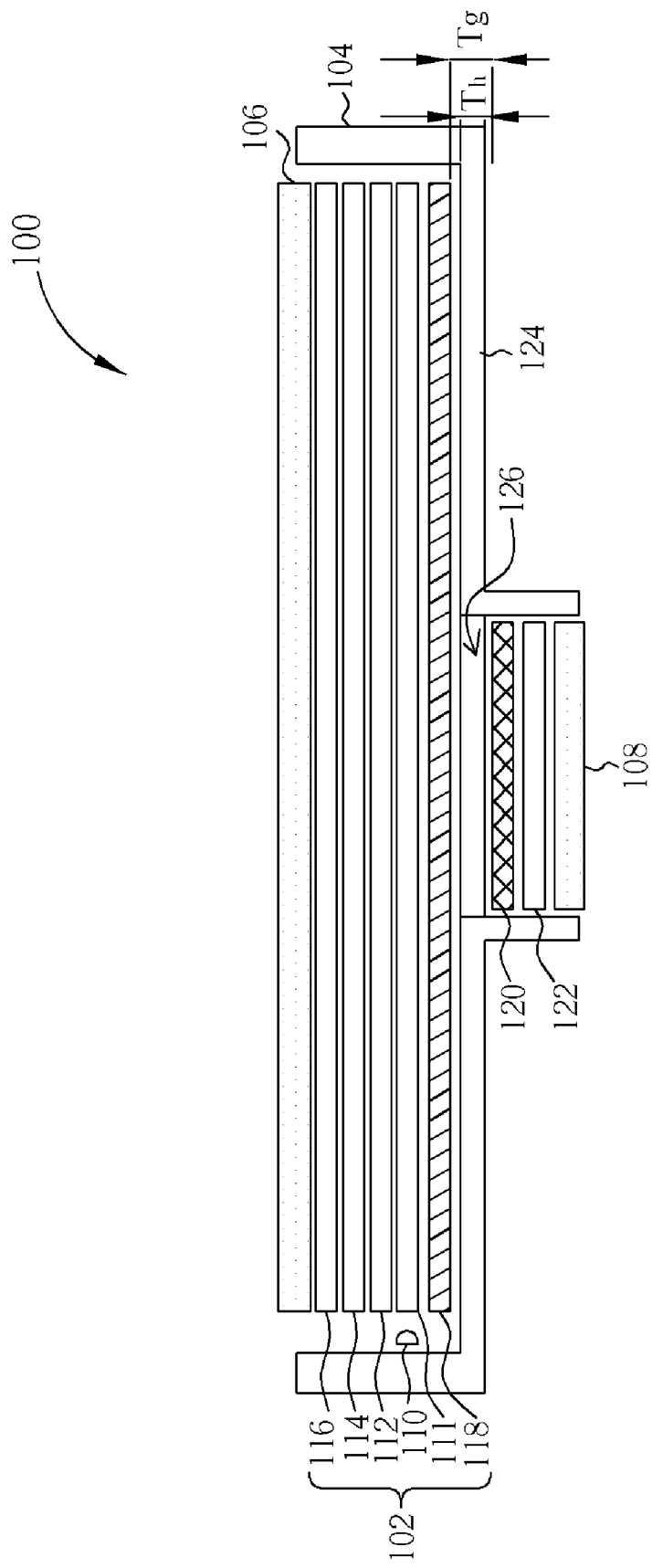
FIG. 12 is a sectional view of a dual panel display according to a third embodiment of the present invention.

With reference to FIG. 12, FIG. 12 is a sectional schematic diagram of a dual panel display according to a third embodiment of the present invention. The dual panel display 100 in FIG. 12 comprises a backlight module 102, a main display panel 106, a sub-display panel 108, and a housing 104 with a fixing plane 124. The backlight module 102 is positioned between the main display panel 106 and the fixing plane 124, and includes a diffuser film 116, a prism film 114, a diffuser film 112, a light source 110, a light guide plate 111, and a transflective film 118 from top to bottom. The size of the sub-display panel 108 is smaller than that of the main display panel 106, and the fixing plane 124 has an opening 126 so that the backlight module 102 can provide light to the sub-display panel 108. In addition, the dual panel display 100 further comprises a diffuser film 122 positioned between the sub-display panel 108 and the housing 104, and an optical property enhancement film 120 positioned between the diffuser film 122 and the housing 104. In this embodiment, the size of the optical property enhancement film 120 is approximately the same as the size of the opening 126. However, the size of the optical property enhancement film 120 may be larger as design requirements, such as the same as the size of the transflective film 118. It should be noted that the thickness $T_h$ of the fixing plane 124 should be as thin as possible according to this embodiment because the gap $T_g$ between the transflective film 118 and the optical property enhancement film 120 influences on the window problem of the main display panel 106 near the opening 126. According to the present invention, the fixing plane 124 is preferably less than 5 mm so that there is a smallest gap $T_g$ between the transflective film 118 and the optical property enhancement film 120 for improving the window problem of the main display panel 106.

Figure 13:
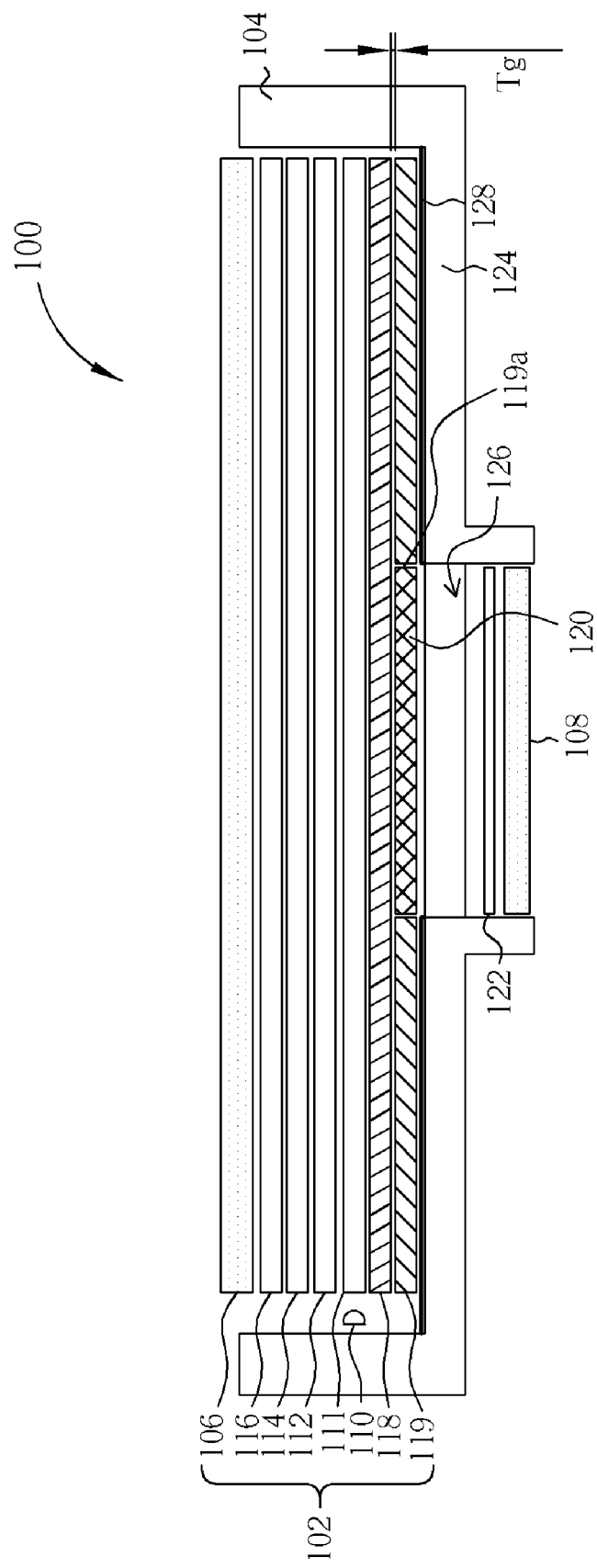
FIG. 13 is a sectional view of a dual panel display according to a fourth embodiment of the present invention.

Please refer to FIG. 13. FIG. 13 is a dual panel display according to a fourth embodiment of the present invention; wherein the numerals of elements used in FIG. 13 is the same as the numerals in FIG. 12. The backlight module 102 of this embodiment comprises two transflective films 118,119. The transflective film 119 near the fixing plane 124 has a cavity 119a with a size approximately the same as that of the opening 126 of the fixing plane 124. In the cavity 119a is an optical property enhancement film 120 little smaller than the cavity 119a. Under this design, the optical property enhancement film 120 and the transflective film 118 can have a very small gap $T_g$, regardless of the thickness of the fixing plane 124, and therefore it can effectively improve the window problem of the main display panel 106. It should be noted that the sizes and shapes of the cavity 119a and the optical property enhancement film 120 are not limited to those shown in FIG. 13. In addition, one or more optical property enhancement films or transflective films may be disposed between the transflective film 119 and the fixing plane 124 or between the fixing plane 124 and the diffuser film 122 for meeting various requirements.

Furthermore, the dual panel display 100 can selectively comprises a white or a silver reflection sheet 128 on the surface of the fixing plane 124 for reflecting most light back to the main display panel 106 so as to raise the brightness of the display panel, wherein the reflection sheet 128 also has a cavity or an opening corresponding to the opening 126 of the fixing plane 124. As a result, light can pass the cavity or the opening of the reflection sheet 128 and the sub-display panel 108 can obtain the light source. In addition, for improving the display images of the main display panel 106, the designer may thicken the thickness of the diffuser film 112 to sufficiently scatter light in the diffuser film 112 so as to uniform light of the main display panel 106.

To conclude, the present invention provides a method of improving the display images of a dual panel display, which comprises providing at least a transflective film disposed between the light guide plate and the fixing plane for partially reflecting light from the light guide plate back to the light guide plate, and providing at least an optical property enhancement film disposing at a side of the light guide plate adjacent to the sub-display panel so that the optical property enhancement film can enhance local optical property to improve the optical performance of the main display panel near the opening of the fixing plane. The transflective film is selected from the group consisting of transparent sheet, dual brightness property enhancement film, lens, diffuser film, and films with an adjustable transmission rate or an adjustable reflection rate, and the optical property enhancement film is selected from the group consisting of transparent sheet, dual brightness property enhancement film, lens, reflection film, and diffuser film.

Figure 14:
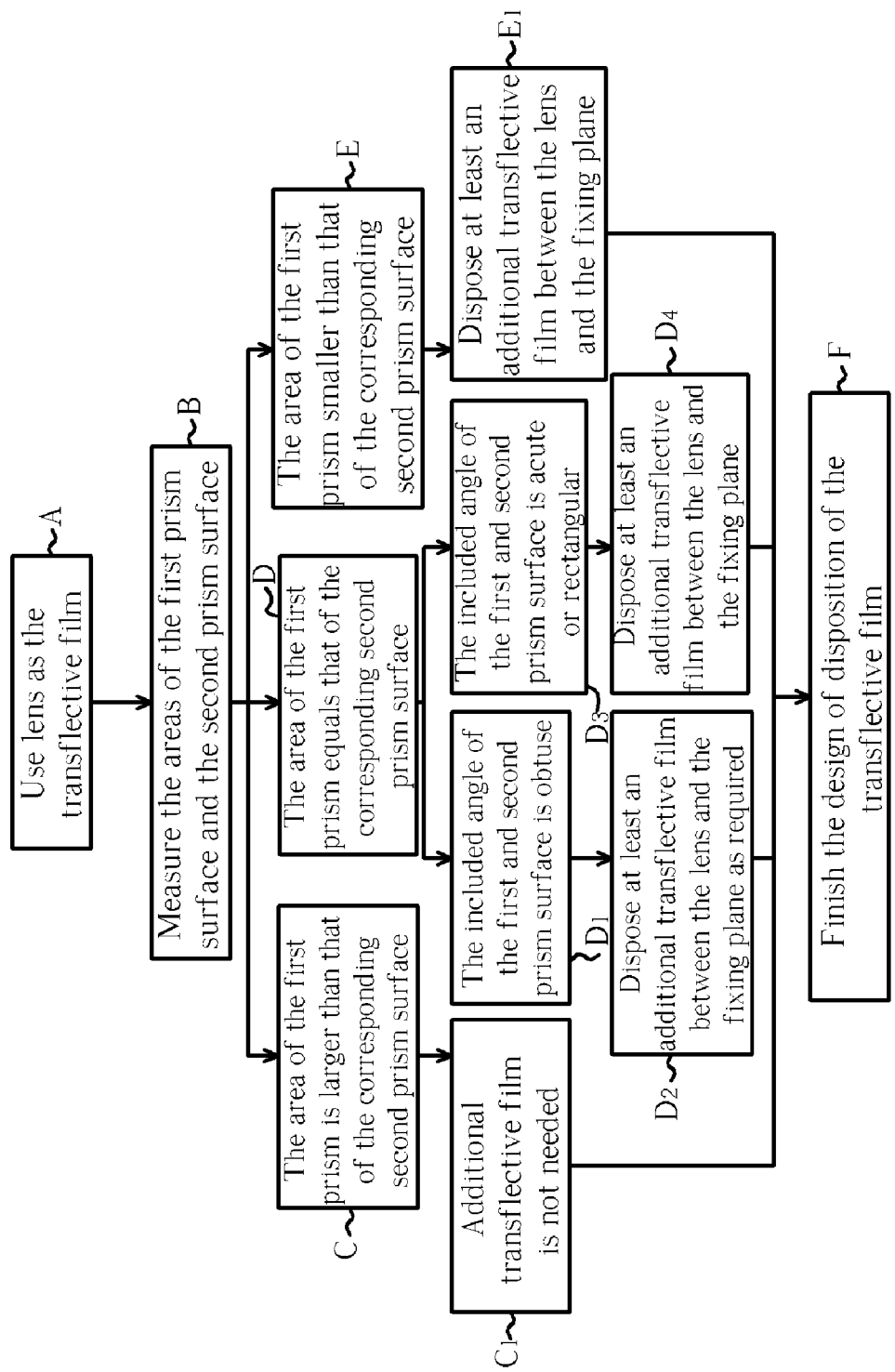
FIG. 14 is a flow diagram of the design of backlight module according to the present invention by taking a lens as the transflective film.

It should be noted that the designer of the dual panel display backlight module has to determine the amount of the transflective film in the backlight module according to the design of the prisms of the transflective films when the transflective films are lenses. With reference to FIG. 14, FIG. 14 is a flow diagram of the design of the dual panel display according to the present invention by taking a lens as the transflective film of the backlight module. The design step is described as below:

Step A: Use lens as the transflective film. As described above, the lens comprises a plurality of prisms, and each of which is a protrusion composed of a first prism surface and a corresponding second prism surface, wherein the first prism surface faces the light source and the second prism surface faces away from the light source. Execute step B;

Step B: Measure the areas of the first prism surface and the second prism surface of each prism, and design to execute step C, step D, or step E according to the measurement result;

Step C: The area of each first prism surface is larger than the area of its corresponding second prism surface. Execute step $C_1$;

Step $C_1$: Another transflective film is not needed. Execute step F directly;

Step D: The area of each first prism surface equals that of the corresponding second prism surface. Measure the included angle of the first and the second prism surfaces, and then execute steps $D_1$ or $D_2$;

Step $D_1$: When the included angle of the first and the second prism surfaces is obtuse, execute step $D_2$;

Step $D_2$: Selectively dispose at least an additional transflective film between the lens and the fixing plane as required, wherein the transflective film is preferably a transparent sheet. Execute step F;

Step $D_3$: When the included angle of the first and the corresponding second prism surfaces of each prism is rectangular or acute, execute step $D_4$;

Step $D_4$: Dispose at least an additional transflective film between the lens and the fixing plane, wherein the additional transflective film is preferably a transparent sheet. Execute step F;

Step E: The area of each first prism surface is smaller than the area of the corresponding second prism surface. Execute step $E_1$;

Step $E_1$: Dispose at least an additional transflective film between the lens and the fixing plane, wherein the transflective film is preferably a transparent sheet. Execute step F;

Step F: Finish the design of disposition of the transflective film.

In contrast to the prior art, it is an advantage that at least a transflective film and at least an optical property enhancement film are disposed between the light guide plate and the sub-display panel of the present invention dual panel display, wherein the amounts and order of the transflective film and the optical property enhancement film may be various if necessary. Therefore, light amount from the light guide plate propagating to the sub-display panel can be effectively adjusted and light reflected back to the light guide plate can also be raised so as to increase the brightness of the display images of the main display panel and improve the window problem of the main display panel near the opening of the housing. In addition, the structure design of the present invention dual panel display provides a very small gap between the transflective film and the optical property enhancement film such that the optical property enhancement film can effectively enhance the brightness near the opening to avoid the window problem of the display images of the main display panel caused by the thickness of the opening of the housing. As a result, the mura or uneven brightness problems of the display images of the main display panel in the prior art can be solved with simple structure designs in accordance with the spirit of the present invention, without changing the pattern design of the light guide plate and much design costs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dual panel display comprising:
    a housing comprising a fixing plane that has an opening;
    a first display panel positioned at a first side of the fixing plane;
    a second display panel positioned at a second side of the fixing plane, a size of the second display panel being approximately the same as a size of the opening; and
    a backlight module positioned between the first display panel and the fixing plane, the backlight module comprising:
        a light guide plate positioned between the first display panel and the fixing plane, the light guide plate having a light-incidence surface, a first light-exit surface and a second light-exit surface, the first light-exit surface and the second light-exit surface being adjacent to the light-incidence surface and parallel to each other;

a light source positioned near the light-incidence surface of the light guide plate;

at least a transflective film positioned between the second light-exit surface and the fixing plane, the at least a transflective film being capable of reflecting part of light propagating from the second light-exit surface back to the light guide plate, and one of the at least a transflective film being a lens; and at least an optical property enhancement film positioned at a side of the second display panel facing toward the light guide plate.

2. The dual panel display of claim 1, wherein the at least an optical property enhancement film is selected from the group consisting of a transparent sheet, a dual brightness property enhancement film, a lens, a reflection film, and a diffuser film.

3. The dual panel display of claim 2, wherein a surface of the at least a transflective film adjacent to the light guide plate comprises a plurality of prisms with a functionality of a lens, and each of the prisms is a protrusion comprised of a first prism surface and a corresponding second prism surface, the first prism surfaces facing the light source and the second prism surfaces facing away from the light source.

4. The dual panel display of claim 3, wherein an area of each of the first prism surfaces is larger than an area of the corresponding second prism surface.

5. The dual panel display of claim 3, wherein an area of each of the first prism surfaces is smaller than an area of the corresponding second prism surface, and the backlight module further comprises a transparent sheet between the at least a transflective film and the fixing plane.

6. The dual panel display of claim 3, wherein an area of each of the first prism surfaces equals an area of the corresponding second prism surface, and included angles of the first prism surfaces and the corresponding second prism surfaces are obtuse angles.

7. The dual panel display of claim 3, wherein an area of each of the first prism surfaces equals an area of the corresponding second prism surface, included angles of the first and the second prism surfaces are acute angles or right angles, and the backlight module further comprises a transparent sheet disposed between the at least a transflective film and the fixing plane.

8. The dual panel display of claim 3, wherein included angles of the first prism surfaces and the corresponding second prism surfaces are different from each other.

9. The dual panel display of claim 1, wherein the at least a transflective film comprises a planar sheet in which a plurality of diffuser particles are spread.

10. The dual panel display of claim 1, wherein a thickness of the fixing plane is less than or equal to 5 mm, and the at least an optical property enhancement film is positioned between the fixing plane and the second display panel.

11. The dual panel display of claim 1, wherein there is a gap between the at least a transflective film and the at least an optical property enhancement film, and the gap is less than 5 mm.

12. The dual panel display of claim 1, wherein a size of the at least an optical property enhancement film is approximately the same as the size of the opening, and the at least a transflective film comprises a cavity for containing the at least an optical property enhancement film.

13. The dual panel display of claim 1, wherein a size of the at least an optical property enhancement film is approximately the same as the size of the opening, and the fixing plane has a cave positioner at the first side of the fixing plane near the opening for containing the at least an optical property enhancement film.

14. The dual panel display of claim 1, wherein the backlight module further comprises one or more diffuser films and at least a prism film positioned between the light guide plate and the first display panel in order.

15. A dual panel display comprising:
a housing comprising a fixing plane that has an opening and a cave positioner at a first side of the fixing plane near the opening;
a first display panel positioned at the first side of the fixing plane;
a second display panel positioned at a second side of the fixing plane corresponding to the opening; and
a backlight module positioned between the first display panel and the fixing plane, the backlight module comprising:
a light guide plate having a light-incidence surface, a first light-exit surface facing toward the first display panel, and a second light-exit surface facing toward the second display panel;
a light source positioned near the light-incidence surface of the light guide plate;
a transflective film positioned between the second light-exit surface and the fixing plane, the transflective film being capable of reflecting part of light propagating from the second light-exit surface back to the light guide plate; and
an optical property enhancement film received in the cave positioner of the fixing plane.

16. The dual panel display of claim 15, wherein the transflective film is a lens, a surface of the lens adjacent to the light guide plate comprises a plurality of prisms with a functionality of a lens, each of the prisms is a protrusion comprised of a first prism surface and a corresponding second prism surface, the first prism surfaces face toward the light source, and the second prism surfaces face away from the light source.

17. The dual panel display of claim 16, wherein an area of each of the first prism surfaces is larger than an area of the corresponding second prism surface.

18. The dual panel display of claim 16, wherein an area of each of the first prism surfaces equals an area of the corresponding second prism surface, and included angles of the first prism surfaces and the corresponding second prism surfaces are obtuse angles or right angles.

19. The dual panel display of claim 16, wherein an included angle of each first prism surface and the corresponding second prism surface is different from an included angle of each other first prism surface and the corresponding second prism surface.

20. The dual panel display of claim 16, further comprising a diffuser film positioned between the transflective film and the fixing plane, wherein the diffuser film comprises a plurality of diffuser particles therein.

21. The dual panel display of claim 15, wherein the transflective film comprises a plurality of diffuser particles spread therein.

22. The dual panel display of claim 21, further comprising a lens positioned between the transflective film and the fixing plane.

23. The dual panel display of claim 15, wherein a gap between the transflective film and the optical property enhancement film is less than 5 mm.

24. A dual panel display comprising:
- a housing comprising a fixing plane that has an opening and a cave positioner at a first side of the fixing plane corresponding to the opening;
- a first display panel positioned at the first side of the fixing plane;
- a second display panel positioned at a second side of the fixing plane corresponding to the opening;
- a light guide plate positioned between the first display panel and the fixing plane;
- a transflective film positioned between the light guide plate and the fixing plane, the transflective film being a lens and capable of reflecting part of light propagating from the second light-exit surface back to the light guide plate; and
- an optical property enhancement film received in the cave positioner of the fixing plane.

25. The dual panel display of claim 24, further comprising a light source adjacent to a side edge of the light guide plate, wherein a surface of the lens adjacent to the light guide plate comprises a plurality of prisms with a functionality of a lens, each of the prisms is a protrusion comprised of a first prism surface and a corresponding second prism surface, the first prism surfaces face toward the light source, the second prism surfaces face away from the light source, an area of each of the first prism surfaces is larger than an area of the corresponding second prism surface, and included angles of the first prism surfaces and the corresponding second prism surfaces are obtuse angles.

26. The dual panel display of claim 24, further comprising a diffuser film positioned between the transflective film and the fixing plane, wherein the diffuser film comprises a plurality of diffuser particles therein.

27. The dual panel display of claim 24, further comprising a diffuser film positioned between the light guide plate and the transflective film, wherein the diffuser film comprises a plurality of diffuser particles therein.

28. The dual panel display of claim 25, wherein a gap between the transflective film and the optical property enhancement film is less than 5 mm.

* * * * *